United States Patent [19]
Malatesta

[11] Patent Number: 5,521,365
[45] Date of Patent: May 28, 1996

[54] LIGHTING ASSEMBLY FOR MAIL SORTING SYSTEM

[75] Inventor: James Malatesta, Hockessin, Del.

[73] Assignee: Promar, Inc., Wilmington, Del.

[21] Appl. No.: 300,754

[22] Filed: Sep. 6, 1994

[51] Int. Cl.$^6$ ..................................................... G06K 7/10
[52] U.S. Cl. ........................ 235/454; 235/462; 235/472; 362/250; 209/584; 209/900
[58] Field of Search .................................. 235/454, 462, 235/472; 362/373, 250, 427; 209/584, 900, 934, 939

[56] References Cited

U.S. PATENT DOCUMENTS

| | | | |
|---|---|---|---|
| 2,922,893 | 1/1960 | Ett | 235/454 X |
| 4,546,420 | 10/1985 | Wheeler et al. | 362/373 X |
| 4,743,773 | 5/1988 | Katana et al. | 235/472 X |
| 5,055,697 | 10/1991 | Manoogian et al. | 362/373 X |
| 5,073,954 | 12/1991 | Van Tyne et al. | 235/462 X |
| 5,189,528 | 2/1993 | Takashima et al. | 358/448 |
| 5,221,141 | 6/1993 | Swanson | 362/250 |

*Primary Examiner*—John Shepperd
*Assistant Examiner*—Michael G. Lee
*Attorney, Agent, or Firm*—Connolly & Hutz

[57] ABSTRACT

A mail sorting system includes a transport surface on which the items of mail are moved in series past a reading station having an aperture where information on the items of mail is read by a reader to assist in the sorting of the mail. The lighting assembly is mounted in the reading station. The lighting assembly includes at least one light or light emitter which directs a path of light toward the aperture. A light diffusion partition is mounted between the light emitter and the aperture for diffusing the path of light before it reaches the aperture. The lighting assembly is mounted displaced from the reader with the light emitter at an angle to the reader to provide the reader with a clear, unobstructed view of the aperture and with the path of light from the light emitter being deflected away from the reader.

14 Claims, 3 Drawing Sheets

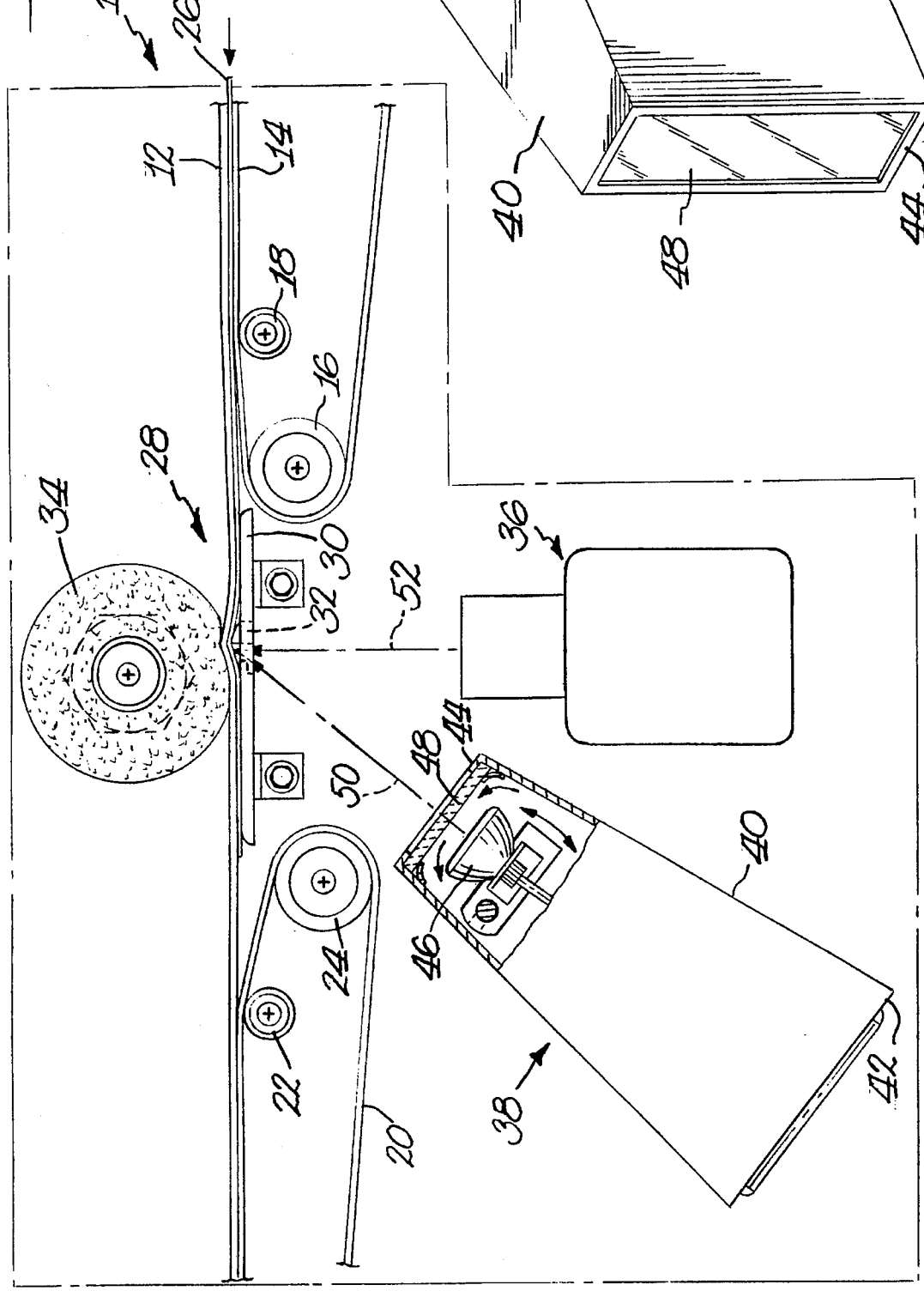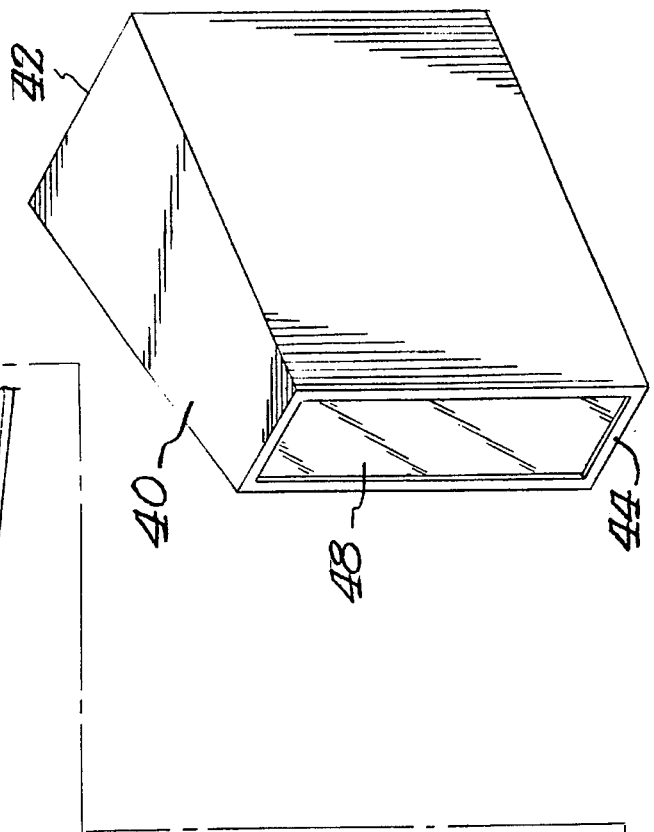

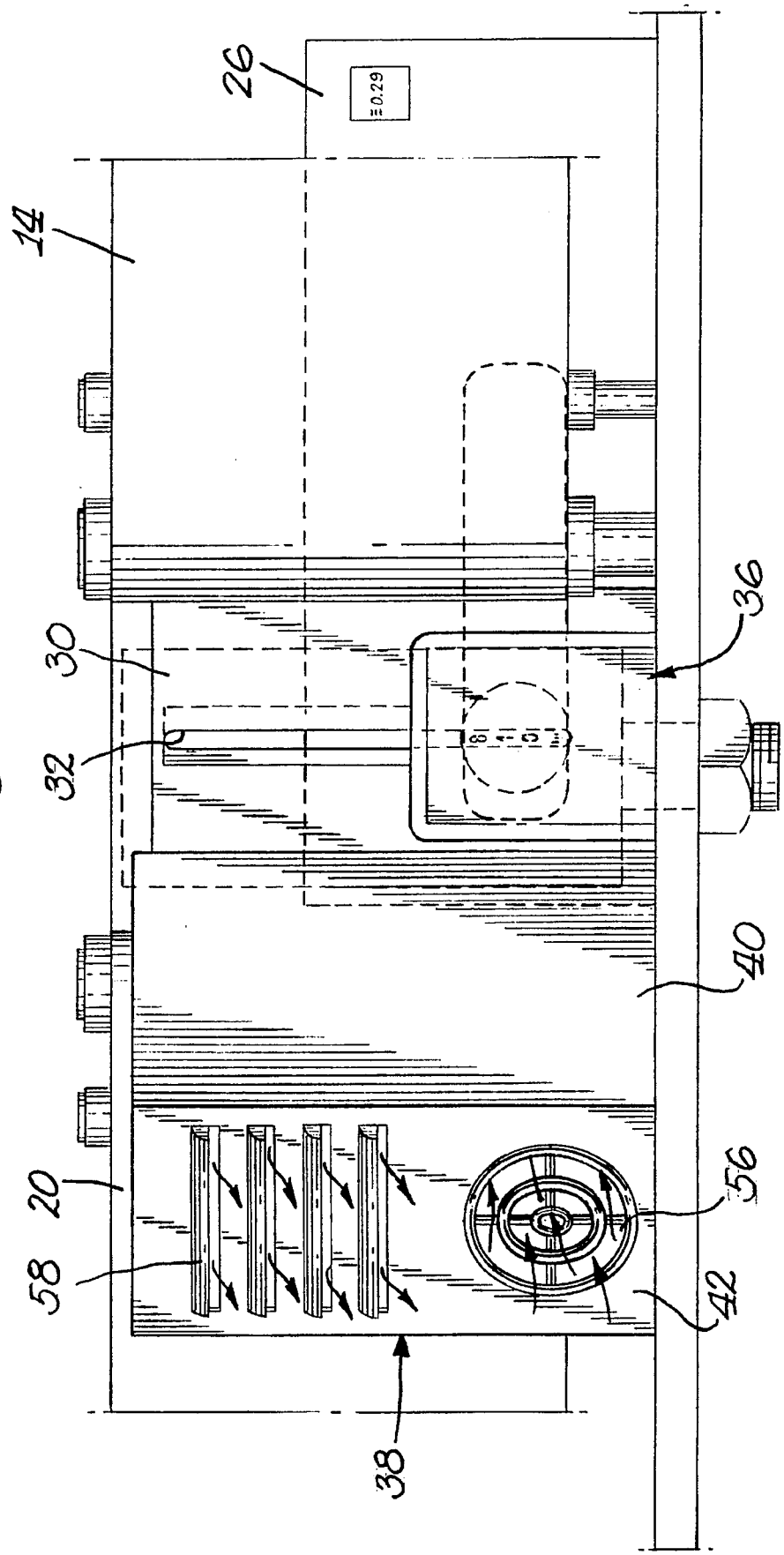

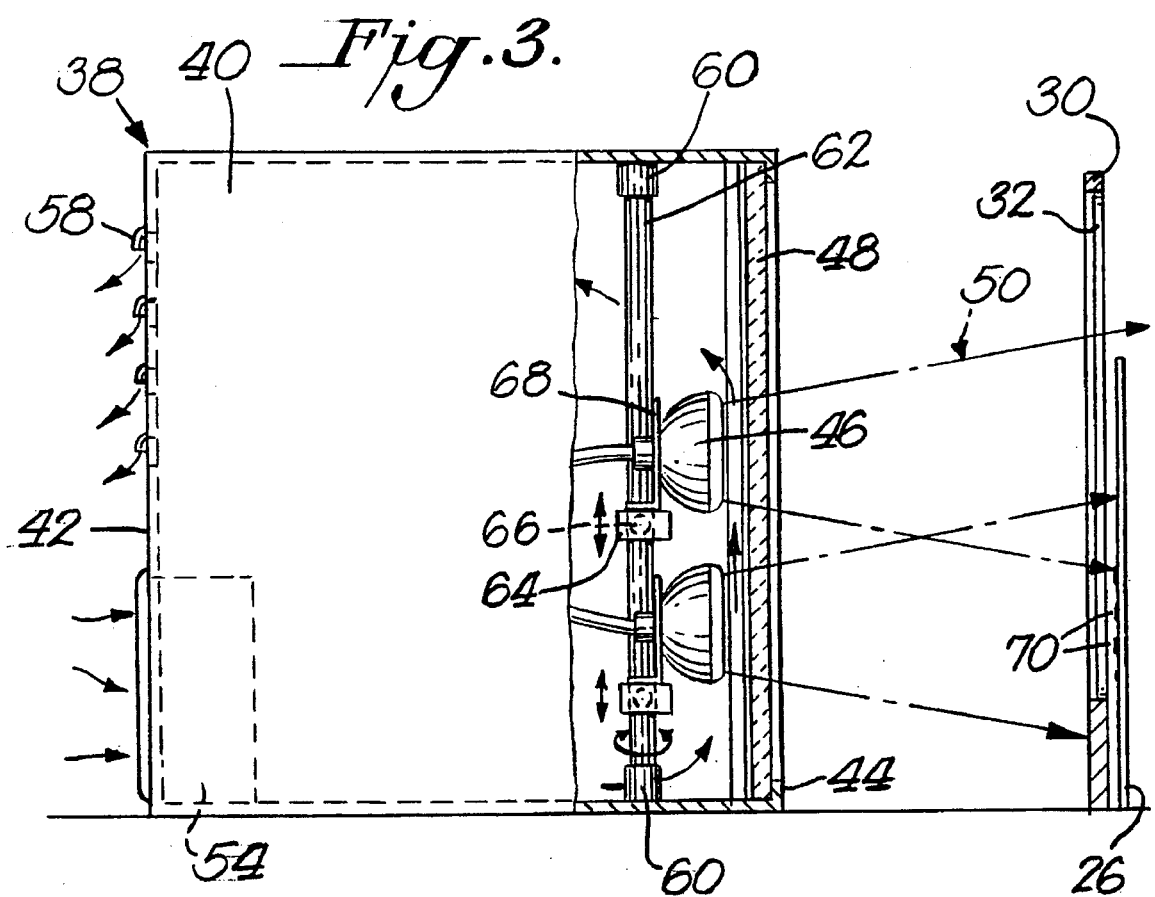

LIGHTING ASSEMBLY FOR MAIL SORTING SYSTEM

BACKGROUND OF THE INVENTION

With the ever increase of mail production automation, different types of mail pieces are being produced which include creative coloring, high-speed address application and other types of imperfect print. As a result, the optical character readers and bar code readers reading ability to process this mail for all types of mailing services at mail automation facilities has been decreasing. It would be desirable to improve the images from the different types of mail to be recognizable by the optical character readers and bar code readers on the new types of mail. Advantage could then be taken to provide increased read rates.

SUMMARY OF THE INVENTION

An object of this invention is to provide a mail lighting assembly which is particularly adapted for use with a high speed mail sorting system that produces even lighting for the optical character reader and bar code reader light on creative colored, imperfect print mail so as to facilitate accurate view by an optical character reader or bar code reader.

A further object of this invention is to provide a mail lighting assembly capable of evenly lighting multi-colored mail pieces, impact print mail pieces and other mail produced on high speed automation equipment.

A still further object of this invention is to provide such a mail lighting assembly which is efficient in operation with minimal parts minimal removal of paper dust and minimal maintenance requirements.

In accordance with this invention, the mail lighting assembly includes a recirculating air supply, a light diffuser partition, and an enclosure compartment having one or more lights mounted on a support member. The re-circulating air supply prevents the heat from the lights from melting, burning or defacing the diffuser partition. The light diffuser partition diffuses the hot and cold spots which are produced by the light filament or bulb and produce uneven images in the optical character reader and bar code reader. The lights can be arranged with one or more lights facing the diffuser partition and are adjusted from side to side or from top to bottom so as to produce the desired lighting on the mail piece. The enclosure compartment is mounted out of the line of site of the optical character reader and bar code reader at an angle so as to direct the path of light at the mail piece and then deflect the path of light after the contact with the mail piece away from the optical character reader and bar code reader. The enclosure compartment also protects the assembly from foreign intervention in the light diffusion process and protects any person from receiving any unwanted light which could interfere with normal operations outside the mail sorter assembly.

In the preferred practice of the invention, the light diffuser partition be a material such as glass so as to provide a transparent surface for the light to travel through while providing diffused mechanism for the same light and prevent the heat from the lights from melting the diffused surface. In the preferred practice of the invention, the lights would be halogen bulbs so as to produce a brighter and cleaner source of lighting rather than a filament light.

Advantageously, the enclosure has the function of acting as a focusing apparatus for the lighting while protecting the assembly from foreign intervention in the light diffusion process and protects any person from receiving any unwanted light which could interfere with normal operations outside the mail sorter assembly.

THE DRAWINGS

FIG. 1 is a top plan view of a lighting assembly in accordance with this invention incorporated in a high speed automated mail sorter system;

FIG. 2 is a side elevational view of the assembly of FIG. 1;

FIG. 3 is a side elevational view partly broken away and in section showing the light assembly illuminating mail passing through the mail transporter; and FIG. 4 is a perspective view of the light assembly enclosure shown in FIGS. 1–3.

DETAILED DESCRIPTION

The present invention is directed to a lighting assembly, particularly designed for use with a high speed automated mail sorting system such as the 91-5 Ultrasorter optical character reader bar code sorting system. In particular, however, the present invention is intended to improve the rate of read of the mail sorting system of the optical character reader and bar code reader. The invention is also particularly useful when incorporated with the mail aperture assembly disclosed in applicant's co-pending application Ser. No. 264,906 filed Jun. 24, 1994, entitled Mail Aperture Assembly For Mail Sorting Systems, the details of which are incorporated herein by reference thereto. In the co-pending application a mail aperture assembly is disclosed wherein the items of mail are deflected to present the items of mail in a better position for having the reader view the appropriate information on the items of mail.

FIG. 1 illustrates a high speed automatic mail sorting system, such as the 91-5 Ultra sorter optical carrier bar code sorting system which includes the mail aperture assembly of the co-pending application. Reference is also made to U.S. Pat. No. 5,226,547, the details of which are incorporated herein by reference thereto for details of a high speed automatic system.

As shown in FIG. 1 the mail sorting system 10 is provided with a transport assembly which includes a belt 12 disposed for contact with a run of belt 14 mounted around rollers 16, 18 and other rollers not shown. Downstream from belt 14 is a further belt 20 disposed for contacting belt 12. Belt 20 is mounted around a set of rollers including rollers 22,24. An item of mail 26 would be transported by being inserted between belts 12 and 14. The item of mail 26 would then pass through a reading station 28 which includes an aperture plate 30 of the type described in the co-pending application. Aperture plate 30 includes structure to deflect the item of mail as it passes by aperture 32. A roller 34 is provided to assure proper tension of belt 12 at the aperture 32. By deflecting the item of mail at the aperture 32 the item of mail flattens at its window and plastic covering against the address and bar code information on the contents inside the envelope eliminating wrinkles and folds and preventing the optical character reader and bar code reader 36 from creating glare in the line of view of the optical character reader and bar code reader 36 on the contents inside the envelope of item of mail 26.

After the item of mail passes by aperture 32 it is conveyed downstream by belts 12 and 20 in a known manner.

The present invention provides a light assembly 38 at the reading station 28 to assure or optimize the illumination of the item of mail at the aperture 32 in a manner that effectively permits the reader 36 to properly function.

As illustrated in the various figures, light assembly 38 includes an enclosure 40 which is generally in the shape of a four-sided frusto pyramid having a generally flat back end 42 and a generally flat front end 44. At least one light emitter 46 is mounted within enclosure 40. Light emitter 46 is preferably a halogen light. A diffuser type partition 48 closes the open end 44 of enclosure 40.

Enclosure 40 and its emitter 46 are mounted displaced from and at an angle to reader 36 so that the path of light 50 projected by light emitter 46 through diffuser partition 48 reaches the aperture 32 to provide sufficient illumination at the aperture so that the reader 36 may properly function. By displacing the enclosure 40 and its components away from reader 36 there is assurance that the enclosure and its components will provide an unobstructed line of site 52 for reader 36. By angling the path of light 50 there is also assurance that the light from the path of light 50 will be deflected away from reader 36 so as not to create any glare or other unwanted light or interference which would hamper the effectiveness of reader 36.

In the preferred practice of this invention a plurality of light emitters or lamps 46 is mounted within enclosure 40 and preferably each of the light emitters is a halogen light which produces a brighter and cleaner source of lighting than from a filament type light. The light diffuser partition 48 is preferably a lens made of glass or other suitable transparent material which permits the path of light 50 to travel through the partition 46 while providing a diffused mechanism for the light and preventing heat from the lamps 46 from melting the diffused surface.

In accordance with this invention air circulation is provided within enclosure 40. FIG. 3, for example, illustrates a fan 54 mounted at back end 42 of enclosure 40. Fan 54 draws air into enclosure 40 through openings 56 in a grill as best shown in FIG. 2. The air is then directed toward the front end 44 of enclosure 40 which is closed by partition 48. The arrows in FIGS. 1 and 3 show the air circulation around the halogen lamps 46. The air then is exhausted through air vents 58 in the back wall 42 of enclosure 40. Cooling the halogen lamps 46 minimizes the possibility of damaging the diffusion lens or partition 48. In addition, the entire assembly is kept at a preferably cooler temperature.

In accordance with a further feature of this invention the halogen lamps or emitters 46 are individually adjustable to provide the best combination of light projecting through diffuser plate 48. FIG. 3 illustrates the manner of adjustment of the individual lamps 46. As shown therein a pair of sockets 60 is mounted to the side walls of enclosure 40. A support post 62 is mounted in the sockets 60. Each lamp or emitter 46 is provided with a mounting block 64 which is mounted to post 62 in a manner to provide for slidable and rotation positioning of the mounting block 64. This could be accomplished in any suitable manner, such as by the provision of a set screw 66 which could be loosened so that the mounting block 64 could be rotated about post 62 and could slide longitudinally on post 62. After the proper orientation has been selected set screw 66 is tightened to lock the mounting block in place. Each mounting block 64 includes an L-shaped bracket 68 to which a corresponding lamp or emitter 46 is mounted. Thus, by adjusting the angular and transverse location of each mounting block 64 there is a corresponding adjustment to the position of its associated lamp 46. These sliding and rotational movements are indicated by arrows in FIG. 3.

In addition to the above described transverse and angular adjustments of lamps 46, there may also be longitudinal adjustment. This may be done in any suitable manner. For example, additional sets of sockets, similar to sockets 60, could be mounted to opposite walls of enclosure 40. All of the lamps could be moved closer or farther from partition 48 but moving the common post 62. If desired, individual lamps may be mounted on separate posts to vary the longitudinal positioning of one lamp with respect to another.

FIG. 3 also shows how the path of light 50 projected from lamps 46 enter the aperture 32 and illuminate the information 70 on item of mail 26 so that the information can be effectively read by the reader 36. In this manner, the illumination could be optimized by the ability to adjust the location of the individual lamps and by the ability to aim hot spots where desired in accordance with the corresponding needs of the reader 36. It is to be understood that while two lamps 46 are illustrated, any suitable number of lamps could be used including only one lamp or more than two lamps.

What is claimed is:

1. In a mail sorting system having a transport assembly for transporting items of mail seriatim past a reading station having an aperture where information on the items of mail is read by a reader to assist in the sorting of the mail, the improvement being in that a guide surface is mounted in said reading station, an aperture plate mounted juxtaposed said guide surface whereby items of mail are conveyed seriatim through said reading station and pass between said guide surface and said aperture plate, an aperture in said aperture plate for selectively exposing the information on the items of mail as the information is disposed at said aperture, said reader having a path of view directed to said aperture, a light assembly mounted in said reading station, said light assembly including at least one light emitter mounted for directing a path of light toward said aperture, a diffuser partition between said light emitter and said aperture for diffusing the path of light before the path of light reaches said aperture, said reader and said lighting assembly being mounted on the same side of said aperture plate as each other, and said lighting assembly being mounted displaced from said reader and at an angle to said reader to provide said reader with a clear unobstructed view of said aperture with the path of light from said emitter being deflected away from said reader.

2. The system of claim 1 wherein said lighting assembly includes an enclosure, said light emitter being mounted within said enclosure, said diffuser partition being mounted to said enclosure, and an air circulating system for circulating air through said enclosure for cooling said light emitter.

3. The system of claim 2 wherein a plurality of said light emitters is mounted in said enclosure.

4. The system of claim 3 wherein each of said light emitters is a halogen light.

5. The system of claim 4 wherein said enclosure has an open front end, and said diffuser partition being mounted at and closing said front end.

6. The system of claim 5 wherein said air circulating system includes a fan mounted in said enclosure remote from said halogen lights at the back end of said enclosure, an inlet grill mounted to said back end of said enclosure for permitting air to be drawn into said enclosure by said fan, and exhaust vents in said enclosure whereby the air drawn into said enclosure may circulate around said halogen lights and be discharged through said exhaust vents.

7. The system of claim 1 wherein said mail sorting system is a high speed automated mail sorting system, and said aperture plate having structure to deflect each item of mail as it passes said aperture.

8. The system of claim 7 wherein said reader is an optical character reader and bar code reader.

9. In a mail sorting system having a transport assembly for transporting items of mail seriatim past a reading station having an aperture where information on the items of mail is read by a reader to assist in the sorting of the mail, the improvement being in that a light assembly is mounted in said reading station, said light assembly including at least one light emitter mounted for directing a path of light toward said aperture, a diffuser partition between said light emitter and said aperture for diffusing the path of light before the path of light reaches said aperture, said lighting assembly being mounted displaced from said reader and at an angle to said reader to provide said reader with a clear unobstructed view of said aperture with the path of light from said emitter being deflected away from said reader, said lighting assembly including an enclosure, said light emitter being mounted within said enclosure, said diffuser partition being mounted to said enclosure, an air circulating system for circulating air through said enclosure for cooling said light emitter, a plurality of said light emitters being mounted in said enclosure, and each of said light emitters being adjustably mounted in its orientation in said enclosure.

10. The system of claim 9 wherein each of said light emitters is rotationally and slidably mounted in said enclosure.

11. In a mail sorting system having a transport assembly for transporting items of mail seriatim past a reading station having an aperture where information on the items of mail is read by a reader to assist in the sorting of the mail, the improvement being in that a light assembly is mounted in said reading station, said light assembly including at least one light emitter mounted for directing a path of light toward said aperture, a diffuser partition between said light emitter and said aperture for diffusing the path of light before the path of light reaches said aperture, said lighting assembly being mounted displaced from said reader and at an angle to said reader to provide said reader with a clear unobstructed view of said aperture with the path of light from said emitter being deflected away from said reader, said lighting assembly including an enclosure, said light emitter being mounted within said enclosure, said diffuser partition being mounted to said enclosure, an air circulating system for circulating air through said enclosure for cooling said light emitter, a plurality of said light emitters being mounted in said enclosure, each of said light emitters being a halogen light, a pair of sockets mounted to said enclosure, a post mounted to and spanning said sockets, each of said halogen lights being mounted to a bracket, each of said brackets being mounted to a mounting block, each of said mounting blocks being mounted on said post, and selective fastening means on each of said mounting blocks to permit each of said mounting blocks to be selectively rotated and slidably moved on said posts.

12. The system of claim 11 wherein said mail sorting system is a high speed automated mail sorting system, an aperture plate being mounted at said aperture, and said aperture plate having structure to deflect each item of mail as it passes said aperture.

13. The system of claim 12 wherein said reader is an optical character reader and bar code reader.

14. In a method of automatically sorting mail in a high speed automated mail sorting system wherein items of mail are moved seriatim past a reading station having an aperture, wherein information on the items of mail is read by a reader to assist in the sorting of mail, the improvement being in conveying the items of mail seriatim through the reading station by passing the items between a guide surface and an aperture plate, selectively exposing the information on the items of mail through the aperture which is located in the aperture plate, mounting a light source and a diffuser partition in the reading station on the same side of the aperture plate as the reader, directing a path of light through the diffuser partition at the reading station with the path of light being directed at an angle to the line of view of the reader so that the reader has an unobstructed view of the aperture, and deflecting the path of light away from the reader upon reaching the aperture.

* * * * *